United States Patent Office 3,275,590
Patented Sept. 27, 1966

3,275,590
DISPERSING CARBON BLACK IN TEREPHTHALATE POLYESTERS BY SAND GRINDING
Lee W. Thomas, Kinston, N.C., assignor to E. I. du Pont de Nemours and Company, Wilmington, Del., a corporation of Delaware
No Drawing. Filed Feb. 21, 1962, Ser. No. 174,699
4 Claims. (Cl. 260—40)

This invention relates to the production of filaments, fibers, and yarns of synthetic linear condensation polyeseters, and is particularly concerned with a novel process for incorporating and homogeneously dispersing a finely-divided insoluble pigment in molten polyesters before shaping.

Methods of producing articles of commerce, such as fibers and films, from synthetic linear condensation polyesters are well known, having been previously described in numerous patents, such as U.S. Patents No. 2,465,319 to Whinfield et al., No. 2,901,466 to Kibler et al., and No. 2,595,343 to Drewitt et al., and in Belgium Patent No. 563,173. A particularly important representative of these polyesters is polyethylene terephthalate which may be prepared by reacting dimethyl terephthalate with ethylene glycol in the presence of a catalyst to form bis-$\beta$-hydroxyethyl terephthalate, and then heating the bis-$\beta$-hydroxyethyl terephthalate under reduced pressure, in several stages, to produce high molecular weight polyethylene terephthalate. The polymer may then be extruded directly into fibers or films, or alternatively, extruded as a ribbon, cut into flake, and later remelted for extrusion into shaped structures. Several other manufacturing processes have been disclosed in published literature.

It is common practice to include pigments of various sorts in the molten polymer before spinning for the purpose of producing a colored or delustered filament or film. One method of adding pigments to polyesters which has been used commercially involves the preparation of a slurry of the pigment in a portion of the glycol being used to prepare the polyester, and injecting the glycol slurry into the polymerization mixture at some appropriate point. Other methods for incorporating pigments include the injection of aqueous slurries of pigment into the polymerization system, as well as the procedure of tumbling polymer flake with dry pigment before melting and extruding.

Known methods for incorporating certain pigments and delusterants in polyesters have proven reasonably satisfactory, particularly for delusterants such as titanium dioxide. However, known methods have not been found satisfactory for incorporating finely-divided carbon blacks, particularly the channel blacks having a particle size in the 0.007 to 0.035 micron range. Conventional methods for incorporating pigments in molten polymer, when used for fine carbon blacks, produce a dispersion of agglomerated particles of excessive size which tend to give a reddish cast to the pigmented article. Agglomeration also results in optical inefficiency for the pigment, surface defects in the pigmented article, and reduced strength in pigmented articles such as fibers. Furthermore, methods which depend upon the injection of a slurry of carbon, in glycol or water, into the usual polyester polymerization system require that an extra amount of solvent be removed from the system, which may overload the vacuum system and reduce productivity.

It is an object of this invention to provide a novel process for incorporating a finely-divided pigment into a molten polyester without adding an extra amount of volatile solvent to the polymerization system. A further object is the provision of a process for preparing pigmented polyester yarns in which a finely-divided pigment such as carbon black is dispersed in the polymer more uniformly than previously possible. Another object is the provision of a method of adding various adjuvants in powder form to a polyester polymerization system without the necessity of going through a solvent slurry stage. Other objects will become apparent from the following description of the invention.

The objects of this invention are accomplished by the improvement, in the process of preparing a synthetic linear condensation polyester for extrusion into shaped structures, of sand grinding a slurry of a pigment in molten prepolymer, containing up to 10 parts by weight of pigment per 100 parts of polymer, by high-speed agitation at a temperature above the melting point of the prepolymer with a volume of 20–40 mesh sand sufficient to give a sand-to-polymer ratio in the range of 0.8 to 1.2 by volume for sufficient time to produce a pigment dispersion of less than 1 micron particle size, then separating the sand and thereafter subjecting the pigmented prepolymer to polymerizing conditions to produce a high molecular weight, pigmented synthetic linear condensation polyester suitable for extrusion to form filaments and other shaped articles of outstanding color properties. Alternatively, a pigmented prepolymer of relatively high pigment concentration, prepared by sand grinding, may be blended with fully polymerized unpigmented polymer to produce a polymer of intermediate molecular weight and intermediate pigment concentration suitable for forming shaped articles.

The invention is particularly useful for dispersing finely-divided carbon black in the difficult problem of producing spun-dyed black polyester filaments, where it provides a marked improvement in dispersion quality, stability, and jetness, but is also useful when using other insoluble pigments either alone or in combination in the production of pigmented polyester articles in general. The process is also useful for adding various soluble adjuvants to polyesters.

The term "synthetic linear condensation polyester," as used herein, comprehends a substantially linear polymer of fiber-forming molecular weight comprising a series of predominantly carbon atom chains joined by recurring carbonyloxy radicals,

As used herein, the term "polyester" is intended to include copolyesters, terpolyesters, and the like. Included, for example, are polyesters disclosed in Whinfield et al. U.S. Patent No. 2,465,319 and Kibler et al. U.S. Patent No. 2,901,466. Polyesters having an intrinsic viscosity of at least about 0.3 are considered to be of fiber-forming molecular weight.

The term "pigmented" synthetic linear condensation polyester is intended to refer to polyester compositions having a pigment which is insoluble in the polyester dispersed uniformly throughout the polyester. The pigment may be either organic or inorganic. Mixtures of pigments may be used. Especially to be mentioned is carbon black, for which the process of this invention is found to give excellent results. Other pigments which may be used include titanium dioxide, which is commonly used as a delusterant, and colored pigments, e.g., phthalocyanine (Color Index No. 74160), a blue pigment. Catalysts and soluble adjuvants, as well as other materials, may be added along with the insoluble pigment, if desired.

The sand grinding step is suitably carried out with a sand grinder of the type shown in Hochberg U.S. Patent No. 2,581,414 and in Hochberg et al. U.S. Patent No. 2,855,156. Critical grinding conditions must be observed. It is preferred that the sand used be Ottowa Silica Sand 20-30 mesh, Standard ASTM designation C-190. The temperature of the grinder must be maintained at a temperature sufficiently high to prevent the prepolymer from solidifying, but not high enough to cause degradation of the polymer or the pigment. For polyethylene terephthalate a suitable temperature range is 260° to 300° C., a temperature in the range of 275° to 285° C. being preferred. The holdup time in the grinding vessel will, of course, depend upon the nature of the pigment being added. Generally speaking, a grinding time of at least 2 minutes will be necessary. Some carbon blacks require grinding times of about 5 minutes before satisfactory results are achieved. Grinding times greater than 30 minutes are not preferred for practical commercial operations. Generally, the volume ratio of sand to prepolymer should fall in the range of 40:60 to 60:40 in order to achieve satisfactory results within a reasonable time. Best results are obtained with a sand to polymer ratio in the range 45:55 to 55:45. A 50:50 ratio is preferred.

The term "prepolymer" is intended to mean partially polymerized monomer having an intrinsic viscosity in the range 0.05 to 0.3. Best results are obtained when the prepolymer used in the sand grinding step has an intrinsic viscosity in the range 0.1 to 0.25. The latter intrinsic viscosity range corresponds roughly to a polymer melt viscosity in the range 1 to 10 poises measured at 280° C. at a low shear rate.

Prepolymer from the sand grinding step, containing dispersed pigment but separated from the sand, is preferaly forwarded through heated conduits directly to a polymerization vessel where it is further polymerized under conditions of elevated temperature and reduced pressure. For polyethylene terephthalate, it is preferred that the final polymerization be carried out at a temperature of about 275° C. and under an absolute pressure of about 1-3 mm. of mercury. The polymerization reaction may be carried out in apparatus such as that described in Vodonik U.S. Patent No. 2,758,915 and in Ryder U.S. Patent No. 2,869,838, if a continuous process is used. The polymer produced is found to contain a uniform dispersion of finely-divided pigment substantially free of aggregates or agglomerates when examined under a light microscope at high magnification. The high quality of the pigment dispersions obtained may also be demonstrated by the preparation of electron micrographs.

Pigmented polymer from the final polymerization stage may be transferred without cooling to a suitable extrusion apparatus for the preparation of filaments or films. Alternatively, the polymer may be extruded as a ribbon, solidified and cut into flake, and stored for a later remelting and extrusion into shaped structures.

The intrinsic viscosity of the polymer is used herein as a measure of the degree of polymerization of the polymer and may be defined as limit of the fraction $$\frac{\ln \eta_r}{C}$$

as C approaches zero, wherein $\eta_r$ is the viscosity of a dilute solution of the polymer in a solvent divided by the viscosity of the solvent per se measured in the same units as the same temperature of 25° C.; and C is the concentration in grams of polymer per 100 ml. of solution. Fomal, which is 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent.

A convenient method for examining the quality of the dispersions produced by the process of this invention is as follows:

A small quantity of the pigmented polymer is melted on a glass microscope slide and pressed into a thin film with a cover glass. Care is taken to prevent overheating which causes flocculation. Temperatures up to about 300° C. are suitable for polyethylene terephthalate. The prepared slide is then examined with transmitted light, using a microscope capable of resolving clearly particles larger than about 0.3-0.4 micron. Thus, in the absence of pigment particles larger than about 0.4 micron, a polymer containing an appreciable amount of pigment presents a fine-textured appearance to the over-all field of vision. Larger particles, if present, stand out from the field and are easily counted. Dispersions of carbon black are considered to be satisfactory if very few particles as large as one micron are visible and most of the particles are smaller than 0.25 micron.

The character and size distribution of particles less than about 0.3 micron is best examined by means of an electron microscope.

The following examples will serve to further illustrate the invention and are not intended to be construed as limitative.

Example 1

Bis-β-hydroxyethyl terephthalate is prepared by ester interchange from dimethyl terephthalate and ethylene glycol following the general procedure described in Whinfield et al. U.S. Patent No. 2,465,319, and then partially polymerized at a temperature of 280° C. and an absolute pressure of 20 mm. of mercury to produce prepolymer having an intrinsic viscosity of 0.2. Four hundred grams of prepolymer is transferred to a 1000 ml. beaker fitted with an electric heating mantle and stirring means consisting of a pair of poly(tetrafluorethylene) discs three inches in diameter mounted on a vertical shaft powered by an electric motor capable of 2,000 revolutions per minute. The general arrangement of the stirrer is similar to that of FIGURE 1 of Hochberg U.S. Patent No. 2,581,414. The temperature of the beaker is maintained at about 280° C. With agitator turned on, 1000 grams of preheated sand is added to the beaker, and powdered dry pigment poured onto the top of the agitated prepolymer. The mixture is allowed to grind for about five minutes and then the prepolymer mixture is separated from the sand for examination. Samples are examined by optical microscope, as previously described, with the results shown in the following table where a rating of "good" indicates the absence of particles larger than about 0.4 micron. Selected samples are also examined by electron microscope, which reveals that most of the pigment particles are in the 0.1-0.3 micron range.

The channel black used in items A, C and D is that supplied by Columbian Carbon Company under the trademark "Excelsior." It has an ultimate particle size of 0.016 micron (when agglomerates are dispersed) and a particle surface area of about 230 square meters per gram as determined by nitrogen absorption. The channel black used in item B is a similar finely-divided carbon black supplied by Witco Chemical Company under the trademarg "Witcoblak," and having an ultimate particle size of 0.018 micron.

TABLE 1

| Item | Pigment | Concentration, percent | Dispersion Character |
|---|---|---|---|
| A | Channel black | 2 | Good. |
| B | ----do---- | 2 | Do. |
| C | ----do---- | 4 | Do. |
| D | ----do---- | 8 | Do. |
| E | TiO₂ (white pigment) | 2 | Do. |
| F | ----do---- | 10 | Do. |
| G | Antimony oxide (Sb₂O₃) | 1 | Do. |
| H | Phthalocyanine (C.I. 74160) blue pigment. | 2 | Do. |

A portion of item A (Table 1) is heated at 275° C. for one hour under a pressure of 2 mm. of mercury to produce a polymer capable of being drawn into a fiber. Upon examination under a microscope, the fiber-forming polymer is found to have a pigment dispersion of excellent quality, being substantially free from agglomerates.

A portion of item A (Table 1) is held at 275° C. in an open beaker for one hour and then examined under a microscope. The pigment dispersion was still rated good, showing the excellent stability of pigment dispersions prepared by the process of this invention.

*Example II*

Dimethyl terephthalate and ethylene glycol are metered continuously to the ester interchange reaction system described by Vodonik in U.S. Patent No. 2,829,153, using manganous acetate as a catalyst, to produce a continuous supply of bis-β-hydroxyethyl terephthalate. The molten bis-β-hydroxyethyl terephthalate is passed continuously through a second vessel where it is partially polymerized at a temperature of 280° C. and an absolute pressure of 20 mm. of mercury to produce prepolymer having an intrinsic viscosity of 0.2. The prepolymer is then fed, along with 2 parts (per 100 parts of prepolymer) of a dry channel black having an average particle size of 0.02 micron, to the feed section of a conventional screw extruder having a torpedo of the type described in Dulmage U.S. Patent No. 2,607,077. The extruder is operated at 280° C. and at atmospheric pressure, with a nitrogen blanket at the hopper section to protect the molten prepolymer from exposure to air and moisture. The carbon black, prepolymer blend produced by the extruder is then fed continuously to the bottom of a sand mill of the type shown in FIG. 1 of Hochberg et al., U.S. Patent No. 2,855,156. The sand mill contains sufficient sand to give a volume ratio of sand-to-prepolymer mixture of about 50:50, and the temperature of the heating jacket of the sand mill is maintained at a temperature of 275° C. The agitator is operated at a speed of 1800 r.p.m. Holdup time in the sandmill is approximately 7 minutes. Milled prepolymer is discharged through the screen at the top of the sand mill and transferred directly, without cooling, to a finisher vessel where polymerization is continued at a temperature of about 275° C. and a pressure of about 2 mm. of mercury. The finished polymer, having an intrinsic viscosity of 0.61, is passed through heated conduits to a spinning machine where it is spun into filaments, subsequently drawn approximately 3.5× in hot water at temperature of 90° C., crimped in a stuffing box crimper, relaxed in an oven at about 140° C. for several minutes, and then cut into staple fiber.

A sample of the staple fiber is melted on a microscope slide and examined at a magnification of 600×. The pigmented polymer has a fine-textured appearance, with essentially no particles present having a size greater than about 0.4 micron. The filaments themselves have an intense jet black appearance with no noticeable red tone.

*Example III*

Example II is repeated with the exception that the screw extruder used for initial addition of dry carbon black is replaced with a second sand mill of the type shown in FIGURE 7 of U.S. Patent No. 2,581,414 which serves as a premix mill. In the premix mill, dry carbon black is metered directly to the surface of the liquid vortex at the top of the mill. The rotor speed is 1750 r.p.m. The jacket temperature is 285° C. Holdup time in the mill is 5 minutes. Excellent premixing of pigment is achieved when the system is operated in this manner. After further polymerization, spinning, and drawing into yarn, examination by microscope reveals an excellent dispersion of pigment is achieved.

As stated previously, this invention is applicable to the introduction of many types of insoluble pigments, both organic and inorganic, into synthetic polyesters with dispersions of excellent quality being obtained. The invention is particularly valuable for the dispersion of fine channel blacks, which have hitherto been particularly difficult to disperse in polyesters in a satisfactory manner. Furthermore, the invention allows the addition of pigments in the dry state, without the use of a solvent-carrying medium, thus eliminating the expense and time needed to prepare pigment-solvent slurries for introduction into the polymer system. Also, the overloading of vacuum systems by the addition of excess solvent is eliminated. Various combinations of pigments may be used to form stable dispersions having essentially no tendency to form agglomerates.

Since many different embodiments of the invention may be made without departing from the spirit and scope thereof, it is to be understood that the invention is not limited by the specific illustrations except to the extent defined in the following claims.

I claim:

1. In the process of polymerizing monomer to form a fiber-forming synthetic linear condensation polyester and extruding the polyester into a shaped structure, the improvement for incorporating finely-divided, carbon black pigment, of interrupting said polymerizing at a prepolymer form of said polyester having an intrinsic viscosity of 0.05 to 0.3 measured in Fomal solvent at 25° C., sand grinding a melt of said prepolymer and up to 10 parts by weight of the carbon black per 100 parts by weight of prepolymer at a temperature of at least 160° C. with 20–40 mesh sand in a bulk volume ratio of sand to prepolymer within the range of 0.8:1 to 1.2:1, continuing sand grinding with high-speed agitation to produce a carbon black dispersion of less than 1 micron size in the molten prepolymer, separating the sand from the prepolymer and preparing a pigmented polyester having an intrinsic viscosity greater than 0.3 from the prepolymer.

2. The process defined in claim 1 wherein about 2 to 10 parts by weight of carbon black per 100 parts prepolymer is added as a dry powder having a particle size of 0.007 to 0.035 micron.

3. The process defined in claim 1 wherein the prepolymer is an ethylene terephthalate polymer having an intrinsic viscosity of 0.1 to 0.25 and the sand grinding is conducting at 260° to 300° C.

4. The process defined in claim 3 wherein, after sand grinding and separating the sand, the prepolymer is heated at about 275° C. under an absolute pressure of about 1–3 mm. of mercury to produce fiber-forming pigmented polyester.

References Cited by the Examiner

UNITED STATES PATENTS

| | | | |
|---|---|---|---|
| 2,581,414 | 1/1952 | Hochberg | 241—22 |
| 2,855,156 | 10/1958 | Hochberg et al. | 241—22 |
| 2,990,291 | 6/1961 | Bartholomay | 241—22 XR |
| 3,002,942 | 10/1961 | Zoetbrood | 260—40 |

MORRIS LIEBMAN, *Primary Examiner.*

MILTON STERMAN, *Examiner.*

A. H. KOECKERT, *Assistant Examiner.*